INVENTOR.
AARON ROSENFELD
KENNETH KUPFERBERG
BY Alfred W. Barber
ATTORNEY

United States Patent Office 3,241,042
Patented Mar. 15, 1966

3,241,042
CONTROL UNIT FOR STABILIZED OUTPUT
VOLTAGE POWER SUPPLY
Aaron Rosenfeld, 35—50 82nd St., Jackson Heights,
N.Y., and Kenneth Kupferberg, 42—19 147th St.,
Flushing, N.Y.
Filed Dec. 13, 1961, Ser. No. 180,914
(Filed under Rule 47(a) and 35 U.S.C. 116)
3 Claims. (Cl. 323—22)

This invention relates to power supplies having regulated output voltages and, more particularly, to a universal control sub-assembly incorporating much of the critical circuitry of a complete regulated output power supply.

The output temperature stability of a regulated output power supply is determined primarily by two factors. The first factor is the stability of reference circuitry, and the second factor is stability of at least the lower stages of a comparison amplifier from which the regulated output voltage is derived.

The sub-assembly of the present invention consists essentially of two parts. The first part is a regulator to provide a stable reference voltage. The second part is a comparison amplifier for comparing such stable reference voltage to the output voltage of a regulated power supply and correcting such output voltage to a desired value.

To this end, the sub-assembly comprises a back to back zener diode, of the silicon type, selected for temperature stability, means in advance of the diode for maintaining a constant current through the latter irrespective of line fluctuations, and a comparison amplifier following the diode and compensated for temperature drift. The reference voltage circuitry comprises two balanced amplifier stages in cascade each acting in such a manner as to be self compensating with respect to temperature drift characteristics. In the comparison amplifier, the two lowest level transistors also tend to cancel each other's thermal drift, these two lowest level stages comprising an NPN emitter follower, followed by a PNP common emitter amplifier.

The reference voltage source, and an adjustable resistance in series therewith, are adapted to form two arms of a reference bridge or network of the type shown in the copending application of Aaron Rosenfeld, Serial No. 752,694, filed August 4, 1958, and the comparison amplifier is arranged to form the diagonal of such a bridge or network. The other two arms of the bridge, as in the case of said co-pending application, are composed of the load voltage terminals and an adjustable resistance for presetting the desired output or load voltage and connected in series with such terminals. The unit of the present invention is adapted to be plugged into a first terminal comprising one load terminal and a second terminal comprising the free end of the voltage setting resistance. The invention thus provides a reference voltage and comparison amplifier unit of universal applicability in such a reference bridge or network, and may be used with any such reference network or bridge having widely varying values of output voltage and adjustable output voltage setting resistances.

Accordingly one object of the present invention is to provide a plug-in unit containing a voltage reference, a bridge arm resistor, and an error amplifier suitable for use in a wide variety of voltage regulated power supplies.

Another object is to provide a plug-in unit forming parts of a bridge circuit suitable for use in a wide variety of voltage regulated power supplies and including a temperature compensated reference voltage device and a temperature compensated error amplifier.

Still another object is to provide a plug-in reference and error signal amplifier together with other circuit components common to the required circuitry of a wide variety of regulated power supplies.

These and other objects will be apparent to those skilled in the art as will be seen from the detailed description of the invention given in connection with the various figures of the drawing.

Figure 1:
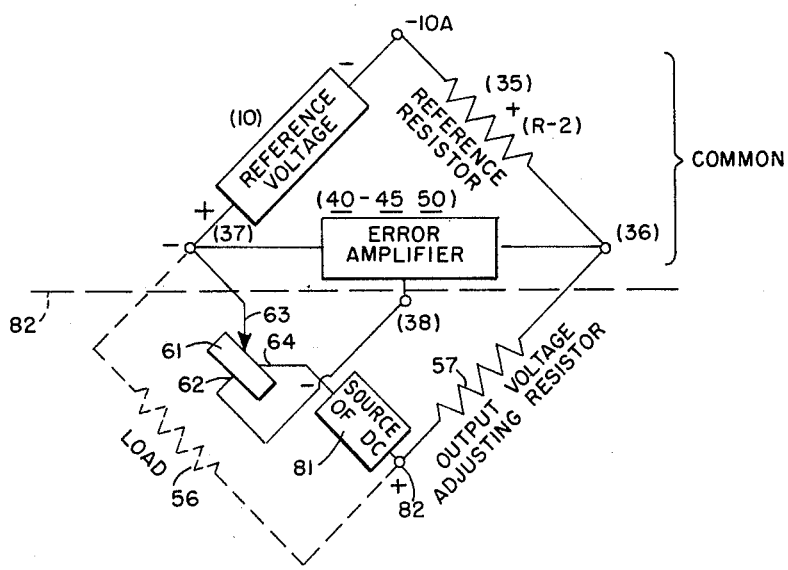
FIGURE 1 is a diagram partly schematic and partly in block form showing a typical regulated power supply utilizing the reference voltage, bridge arm reference resistor and error amplifier in accordance with the present invention.

FIG. 1 shows the essential parts of a typical regulated power supply utilizing the control unit in accordance with the present invention. The parts shown above dotted line 82 comprise the control unit which is common to a wide variety of regulated power supplies while the parts shown below this line will be varied depending on the current and voltage to be supplied to the load by the regulated power supply. The complete circuit for best understanding is drawn in the form of a four terminal bridge. The four terminals of the bridge are 37, 10A, 36 and 82. Two arms of the bridge and the two included in the control unit package are the voltage reference 10 and the fixed reference resistance 35 plus R–2 connected between terminals 37 and 10A, and 10A and 36 respectively. The error amplifier 40–45–50 is also included in the control unit package. The output terminal of the error amplifier 38 is also provided on the control unit package.

The balance of the circuitry will vary in accordance with the current and voltage to be regulated and supplied to a load. The unregulated direct current source 81 may be taken to represent any suitable source of direct current to be regulated. This source of D.C. 81 is connected in series with a suitable series control device such as transistor 61 across terminals 37 and 82 which also serve as the load terminals for load 56. An output voltage adjusting resistor 57 is connected between terminals 36 and 82 to complete the bridge. One common method of connection of the pass transistor 61 is with collector 64 connected to the negative side of D.C. source 81, emitter 63 connected to load terminal 37 and the base or control electrode 62 connected to the error amplifier ouput point 38.

The operation of bridge circuit is as follows:

The error amplifier detects any voltage difference between terminals 36 and 37 and feeds a control signal to terminal 38 and from there to the pass transistor in such a manner as to restore the voltage difference between terminals 36 and 37 to substantially zero. Thus a discussion of the bridge circuit will assume that terminals 36 and 37 are at the same potential and also that no current will flow from terminal 36 to the error amplifier. This condition will be described as the balanced condition of the bridge. Now at balance the voltage drop across resistance 35 plus R–2 must be equal and opposite to the voltage drop across reference voltage source 10 which in turn is fixed. Also the voltage drop across load 56 must be equal and opposite to the voltage drop across output adjusting resistor 57. Now since the voltage drop across resistance 35 plus R–2 is constant and this resistor is fixed, a predetermined fixed current must flow through resistance 35 plus R-2. This fixed current must also flow through resistor 57 since current can leave terminal 36 only into resistor 57 and not into the error amplifier. Now the voltage drop across resistor 57 is equal to this fixed current times its resistance. Since this drop across resistor 57 is equal to the drop across load terminals 37-82, the load voltage may be controlled and set by setting resistor 57 to predetermined values.

Figure 2:
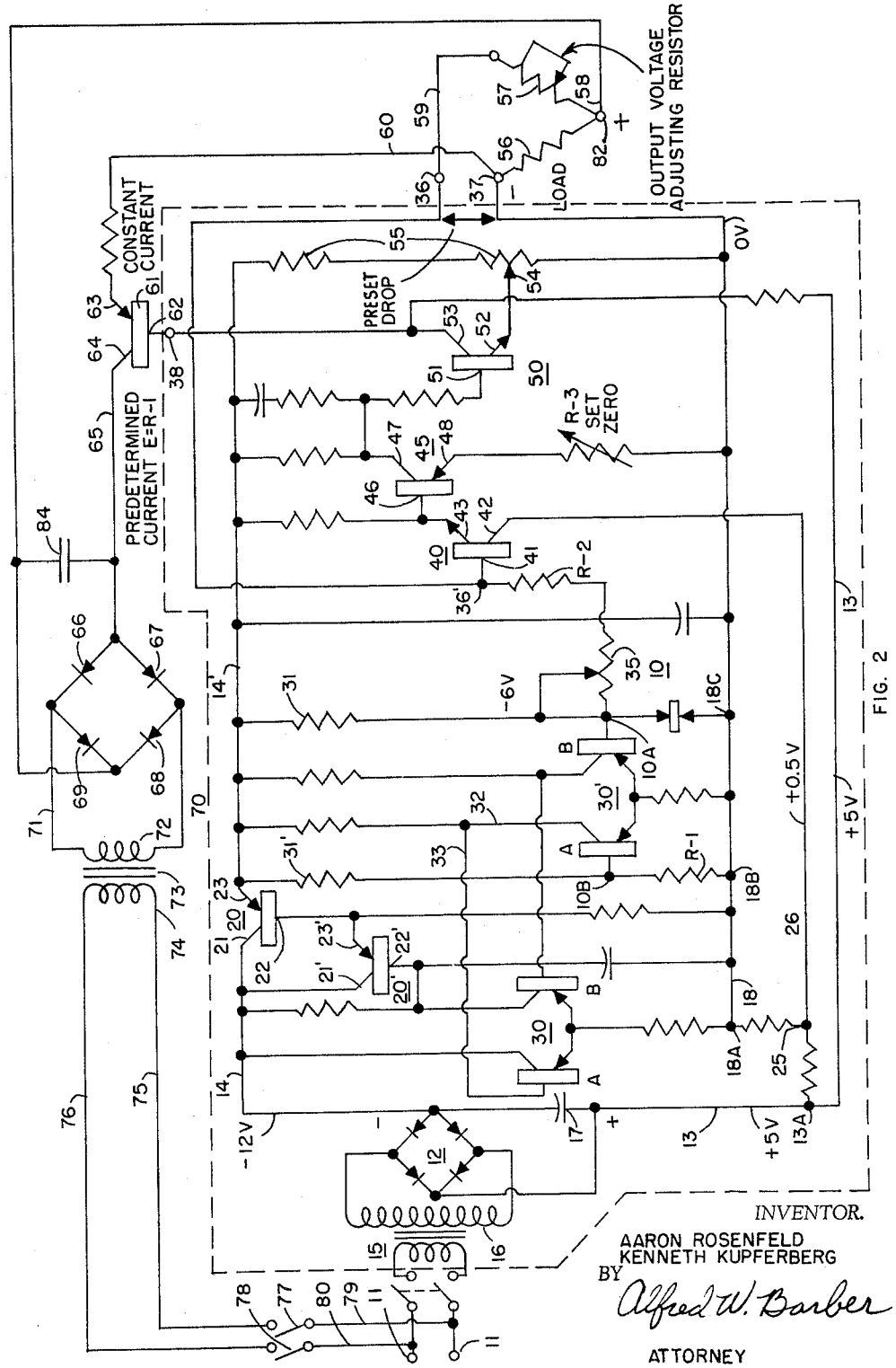
FIGURE 2 is a detailed schematic circuit diagram of the reference voltage source, bridge resistor arm and error amplifier in accordance with the present invention and showing details of the method of connection to the other components of a typical regulated power supply.

Referring to FIG. 2, the reference voltage unit is a back to back zener diode 10 selected for temperature stability. The unstabilized A.C. input is applied through terminals 11 to the primary winding of a transformer 15 having a secondary winding 16. The secondary voltage is applied to a full wave rectifier 12 supplying direct current to a positive conductor 13 and a negative conductor 14. A condenser 17 is connected across the D.C. output of rectifier 12. In a typical practical example, line 13 may be at plus 5 volts and line 14 at minus 12 volts. A voltage divider 25 is connected between junction points 13A and 18A, the latter junction point being connected to a line 18. The mid-point of divider 25 is connected to a line 26. In the aforementioned practical embodiment, the value of divider 25 is so selected that the voltage at the mid-point thereof is one-half volt positive, and the voltage at junction point 18A is zero volts. Line 18 is connected to one of the load or output voltage terminals 37 so that this output voltage terminal is at zero volts.

Two amplifier stages and an associated network are provided in advance of reference diode 10 to maintain the diode current constant and independent of line voltage fluctuations. With the diode current constant, the voltage drop across diode 10 is constant provided there is no variation in current drawn from the diode circuit. Hence the voltage drop thereacross is constant and stabilized, and the diode voltage can be used as the reference voltage.

The reference regulator circuitry includes PNP transistor amplifiers 20, 20' having collectors 21, 21' connected to line 14. Emitter 23 of amplifier 20 is connected to line 14'. Transistor 20 is the pass transistor for the reference voltage stabilizing circuit. Emitter 23' of amplifier 20' is connected to base 22 of amplifier 20.

The reference voltage stabilizing circuit includes cascaded balanced transistor amplifiers 30 and 30', each including a pair of PNP transistors having collectors connected to lines 14 and 14', respectively, and emitters connected through resistors to line 18. The bases of the transistors of set 30 are connected to the collectors of the transistors of set 30'. The bases of the transistors of comparison amplifier 30' are connected to junction points 10A and 10B. Junction point 10A is connected to line 18, at junction point 18C, through the reference zener diode 10. Junction point 10B is connected to line 18 at reference point 18B through resistor R-1.

Reference diode 10 is connected between lines 14' and 18 in series with a resistance 31, one side of diode 10 being connected directly to line 18. In the aforementioned typical practical example, the value of resistor 31 is such that the voltage at junction point 10A is minus 6 volts. A corresponding resistor 31' is connected between line 14' and junction point 10B in series with resistor R-1 so that normally the voltage at junction point 10B is also minus 6 volts.

The reference voltage stabilizing and maintaining arrangement operates as follows: Should the voltage across lines 14' to 18 tend to increase, the current flow through resistor R-1 will increase, thus making junction point 10B more negative. The base of the PNP transistor 30'A thus becomes more negative and its collector becomes more positive. Conductors 32 and 33 connect the collector of transistor 30'A to the base of transistor 30'A, which thus causes its base to become positive and its emitter relatively more positive. Due to the common emitter connection of the transistors of amplifier 30, the collector of transistor 30B becomes more positive and thus the base 22' of transistor 20' becomes more positive. Correspondingly, the base 22 of transistor 20 becomes more positive which results in increased impedance between collector 21 and emitter 23 making emitter 23 more positive thus correcting the increase in the voltage assumed above. As the voltage on line 14' tends to go more positive, the voltage at junction point 10B is restored to its desired value of minus 6 volts. With the line 14' thus regulated a constant current is supplied to zener diode 10 through fixed resistor 31. Consequently, there is maintained a fixed reference voltage at junction point 10A not only due to the zener regulation but refined in effect by a constant current supply to it. Zener diode 10 is preferably a dual anode temperature compensating diode which is designed to maintain its reference voltage accurately in spite of changes in ambient temperature.

A potentiometer 35 in series with a resistor R-2 is connected between junction point 10A and junction point 36'. Junction point 36' is connected directly to terminal 36, and also to the base 41 of the lowest level stage 40 of a transistor comparison or error voltage amplifier including intermediate stage 45 and highest level stage 50. Transistor 40 is an NPN emitter follower having its collector 42 connected to positive line 26 and its emitter 43 connected to the base 46 of transistor 45. When the sub-assembly is incorporated in a complete power supply, the error signal is applied to terminals 36, 37, and terminal 38 is connected to the base of the transistor control amplifier of the power supply.

The two transistors 40, 45 tend to cancel out each other's thermal drift. Collector 47 of amplifier 45 is connected to line 14, and emitter 48 is connected to line 18 through zero set resistor R-3. Collector 47 is also coupled to the base 51 of NPN amplifier 50, whose emitter 52 is connected to the tap 54 of a voltage divider 55 connected between lines 14' and 18. The setting of this tap 54 will determine the maximum current to be passed by pass transistor 61 under overload conditions of the supply. While the description so far has assumed the condition of desired balance is when substantially zero voltage exists between terminals 36 and 37, actually R-3 may be adjusted for a small preset drop across these terminals so that a small predetermined current is supplied to base 41 of transistor 40. Increased responsiveness of the error amplifier is obtained in this way without materially altering the mode of operation of the system.

FIG. 2 also shows one suitable form of source of D.C. current including a power transformer 72-73-74 connected to A.C. power input terminals 11 over lines 75 and 76, through on-off switch 77-78 and over lines 79-80. The power transformer secondary 72 feeds a rectifier configuration 66-67-68-69 over leads 70 and 71 which in turn supplies rectified current to the regulating system and load terminals through a filter consisting of shunt filter capacitor 84.

The basic operation of the regulating system has been described in connection with FIG. 1. In FIG. 2 certain details are brought out. The reference voltage 10 has been described in connection with FIG. 2 above. The reference resistor 35 plus R-2 has been described as a fixed resistor in connection with FIG. 1. In FIG. 2 resistor 35 is shown adjustable. This adjustment is provided to make possible calibrating the system to operate as desired and to compensate for small circuit variations and is essentially a factory adjustment. The error amplifier comprising transistors 40-45-50 is shown in detail in FIG. 2. The input to the error amplifier is between junction 36' and 18C which in turn are directly connected to terminals 36 and 37 respectively. The output of the error amplifier is at collector 53 connected to terminal 38. Thus the control unit comprising the Zener diode reference 10 with its constant current supply, the reference resistor, and the error amplifier have been shown and described in detail together with a showing of one form of suitable system in which it may be used.

Figure 3:
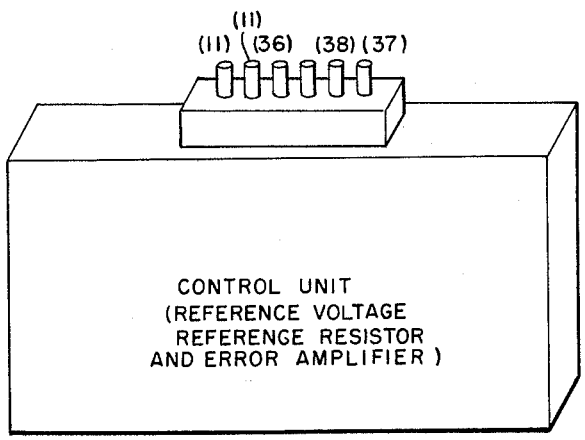
FIGURE 3 is a view of a packaged unit containing the common parts in accordance with the present invention.

FIG. 3 shows an outline drawing of a package containing this control unit and having circuit connecting pins 11, 11, 36, 37 and 38 which may evidently be used in a wide variety of regulated power supplies. As in the case of FIGS. 1 and 2 the same numbers are used to designate the same circuit parts.

While only one embodiment of the present invention has been shown and described many modifications will be apparent to those skilled in the art and within the spirit and scope of the invention as set forth in particular in the appended claims.

What is claimed is:

1. A control unit for a stabilized output voltage power supply comprising, in combination, a back to back zener diode; a pair of input terminals for connection to a source of unstabilized D.C. potential; regulating circuit means connecting said diode to said input terminals and effective to maintain the diode current constant and independent of fluctuations in the potential of such source, whereby the voltage drop across said diode remains constant; a pair of output voltage terminals; and three-stage transistor comparison amplifier means connected between said diode and said output terminals, the two lowest level stages being connected to nullify each other's thermal drift and comprising an NPN emitter follower followed by a PNP common emitter amplifier.

2. A control unit for a stabilized output voltage power supply comprising, in combination, a back to back zener diode selected for temperature stability; regulating contain means for supplying current to said diode including two temperature compensated transistor amplifier stages, said amplifier stages being effective to maintain the diode current constant and independent of fluctuations in the potential of the current source, whereby the voltage drop across said diode remains constant; a pair of output voltage terminals; and three-stage transistor comparison amplifier means connected between said diode and said output terminals, the two lowest level stages being connected to nullify each other's thermal drift and comprising an NPN emitter follower followed by a PNP common emitter amplifier.

3. A control unit for a stabilized output voltage power supply comprising, in combination, a back to back zener diode selected for temperature stability; regulating circuit means connecting said diode to said input terminals including two balanced temperature compensater transistor amplifier stages connected in cascade, said amplifier stages being effective to maintain the diode current constant and independent of fluctuations in the potential of such source, whereby the voltage drop across said diode remains constant; a pair of stabilized output voltage terminals; and three-stage transistor comparison amplifier means connected between said diode and said output terminals, the two lowest level stages being connected to nullify each other's thermal drift and comprising an NPN emitter follower followed by a PNP common emitter amplifier.

References Cited by the Examiner

UNITED STATES PATENTS

| 2,859,405 | 11/1958 | Feldman et al. | 324—77 |
| 2,877,310 | 3/1959 | Donald | 330—17 |
| 2,976,474 | 3/1961 | Dodge | 323—22 |
| 2,984,779 | 5/1961 | Klees | 323—22 |
| 2,979,653 | 4/1961 | Wilcox et al. | 323—22 |
| 3,046,469 | 7/1962 | Young | 323—22 |
| 3,099,790 | 7/1963 | Marshall | 323—22 |
| 3,201,680 | 8/1965 | Ross et al. | 323—22 |

OTHER REFERENCES

Transistorized Regulated Power Supplies—II, Hugh R. Lowry, Electrical Design, March 1, 1956, pp. 32–34.

Static D.C. References for Closed-Loop Controls, Michael Mamon, Electrical Manufacturing, January 1957, pp. 57–60.

LLOYD McCOLLUM, *Primary Examiner.*

G. H. GERSTMAN, H. B. KATZ, D. L. RAE, *Assistant Examiners.*